United States Patent
Mayer et al.

(10) Patent No.: US 10,789,220 B2
(45) Date of Patent: Sep. 29, 2020

(54) MANAGEMENT OF DATABASE API SCHEMA

(71) Applicant: SAP SE, Walldorf (DE)

(72) Inventors: Martin Mayer, Heidelberg (DE); Arne Harren, Walldorf (DE); Matthias Jensen, Walldorf (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 451 days.

(21) Appl. No.: 15/471,801

(22) Filed: Mar. 28, 2017

(65) Prior Publication Data
US 2018/0285390 A1    Oct. 4, 2018

(51) Int. Cl.
G06F 15/16    (2006.01)
G06F 16/21    (2019.01)
G06F 9/451    (2018.01)
G06F 16/25    (2019.01)

(52) U.S. Cl.
CPC ........... *G06F 16/213* (2019.01); *G06F 9/451* (2018.02); *G06F 16/21* (2019.01); *G06F 16/25* (2019.01)

(58) Field of Classification Search
None
See application file for complete search history.

(56) References Cited

U.S. PATENT DOCUMENTS

| | | |
|---|---|---|
| 5,680,573 A | 10/1997 | Rubin et al. |
| 5,925,100 A | 7/1999 | Drewry et al. |
| 5,946,647 A | 8/1999 | Miller et al. |
| 6,055,569 A | 4/2000 | O'Brien et al. |
| 6,728,726 B1 | 4/2004 | Bernstein et al. |
| 6,996,680 B2 | 2/2006 | Mogi et al. |
| 7,284,096 B2 | 10/2007 | Schreter |
| 7,523,142 B2 | 4/2009 | Driesen et al. |
| 7,529,895 B2 | 5/2009 | Blumrich et al. |
| 7,558,822 B2 | 7/2009 | Fredricksen et al. |
| 7,657,575 B2 | 2/2010 | Eberlein et al. |
| 7,720,992 B2 | 5/2010 | Brendle et al. |
| 7,734,648 B2 | 6/2010 | Eberlein |

(Continued)

OTHER PUBLICATIONS

U.S. Appl. No. 14/960,983, filed Dec. 7, 2015, Eberlein, et al.

(Continued)

*Primary Examiner* — Alex Gofman
(74) *Attorney, Agent, or Firm* — Fish & Richardson P.C.

(57) ABSTRACT

Implementations for data migration in a maintenance procedure executed on a software system include actions of providing a first access schema, through which a first version of an application accesses data in a database system, establishing an API-schema, through which at least one direct consumer accesses data in the database system, the API-schema including one or more proxy objects that are mapped to respective one or more objects of the first access schema based on metadata of the API-schema, the metadata providing a mapping and one or more object definitions, and in response to execution of a maintenance procedure: providing a second access schema, through which a second version of the application accesses data in the database system, switching to the second access schema, and revising the mapping of the API-schema, such that at least one proxy object of the API-schema maps to a respective object of the second access schema.

20 Claims, 6 Drawing Sheets

(56) References Cited

U.S. PATENT DOCUMENTS

| | | |
|---|---|---|
| 7,739,387 B2 | 6/2010 | Eberlein et al. |
| 7,941,609 B2 | 5/2011 | Almog |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boller et al. |
| 8,600,916 B2 | 12/2013 | Chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 2004/0117398 A1 | 6/2004 | Idei et al. |
| 2006/0069715 A1 | 3/2006 | Vayssiere |
| 2006/0098253 A1 | 5/2006 | Masuno et al. |
| 2010/0023925 A1 | 1/2010 | Shribman et al. |
| 2010/0153341 A1 | 6/2010 | Driesen et al. |
| 2012/0036165 A1* | 2/2012 | Driesen ............... G06F 16/217 707/803 |
| 2012/0089664 A1 | 4/2012 | Igelka |
| 2012/0284080 A1 | 11/2012 | Oliveira et al. |
| 2013/0007259 A1 | 1/2013 | Pacheco-Sanchez et al. |
| 2013/0167079 A1 | 6/2013 | Ari et al. |
| 2014/0359594 A1 | 12/2014 | Erbe et al. |
| 2015/0106140 A1 | 4/2015 | Biewald et al. |
| 2015/0161182 A1* | 6/2015 | Baeuerle ............... H04L 67/141 707/803 |
| 2016/0085777 A1* | 3/2016 | Engelko ............... G06F 16/211 707/803 |

OTHER PUBLICATIONS

U.S. Appl. No. 15/083,918, filed Mar. 29, 2016, Eberlein et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 5, 2016, Specht et al.
U.S. Appl. No. 15/285,745, filed Oct. 5, 2016, Mayer.

\* cited by examiner

MANAGEMENT OF DATABASE API SCHEMA

BACKGROUND

Entities, such as software developers and/or vendors, provide software and services. Example software can include enterprise software. In some examples, enterprise software can include application software (an application) that interacts with one or more databases. For example, an application can be hosted on one or more application servers, and a user can interact with the application using a client device. In some examples, user interaction can result in data being read from, written to, and/or modified within one or more databases. In some instances, multiple application servers are implemented an include several schemas in the database(s) and central connection management.

During a lifecycle of the application and/or database, one or more maintenance operations may be required. Example maintenance operations include upgrading, configuring, patching, and testing. In order to perform such maintenance procedures, a procedure can be executed, which creates a second schema for each existing schema to prepare, for example, new version (V2). During or after the upgrade (depending on the procedure variant), the application server is configured to connect to a new schema. This, however, can include disadvantages. For example, in cases of direct database access by a relatively large number of users, change to the new schema cannot be easily performed centrally, and a lot of users would have to access the database differently. This can result in errors.

SUMMARY

Implementations of the present disclosure include computer-implemented methods for executing lifecycle procedures on a software system. In some implementations, actions include providing a first access schema, through which a first version of an application accesses data in a database system, establishing an API-schema, through which at least one direct consumer accesses data in the database system, the API-schema including one or more proxy objects that are mapped to respective one or more objects of the first access schema based on metadata of the API-schema, the metadata providing a mapping and one or more object definitions, and in response to execution of a maintenance procedure: providing a second access schema, through which a second version of the application accesses data in the database system, switching to the second access schema, and revising the mapping of the API-schema, such that at least one proxy object of the API-schema maps to a respective object of the second access schema. Other implementations of this aspect include corresponding systems, apparatus, and computer programs, configured to perform the actions of the methods, encoded on computer storage devices.

These and other implementations can each optionally include one or more of the following features: the mapping maps a logical name provided in the API-schema to an access schema; the one or more object definitions define a proxy object within the API-schema in view of a respective object within an access schema; actions further include, in response to revising the mapping of the API-schema, adding a proxy object to the API-schema; actions further include, in response to revising the mapping of the API-schema, removing a proxy object from the API-schema; at least one object of one or more of the first access schema and the second access schema includes one of a view object and a projection object, and at least one proxy object of the API-schema includes a view proxy object and a projection view proxy object, respectively; and the API-schema resides in the database system.

Implementations of the present disclosure provide one or more of the following example advantages. Implementations of the present disclosure provide a stable database schema, and user access to data, even if the data is stored in tables is being modified during a lifecycle event. In some examples, the schema name, database object names (e.g., database tables), table or view field names and types remain stable, while a lifecycle management procedure can modify table structures, can copy database tables from one name to another, and can change field types. Implementations of the present disclosure also provide, in parallel, different stable versions of access mechanisms to the database objects by, for example, keeping the existing version stable, and adding a new version of an interface (e.g., a set of new database views). In some examples, temporary inconsistencies are hidden during lifecycle management events. Consequently, implementations are particularly suitable for access to the data during zero downtime upgrades, for example. Implementations also enable changing the target of views and synonyms in the access schema using a single change deployed to the infrastructure, the infrastructure internally automatically determines all dependencies and alters the respective target. In this manner, not all views or synonyms in the access schema have to be modified individually.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to computer-implemented methods for executing lifecycle procedures on a software system. More particularly, implementations of the present disclosure are directed to providing an application program interface (API) schema (API-schema) that enables consumers of database data to directly access a database without changing connection information (e.g., the schema name). In some implementations, and as described in further detail herein, the API-schema includes synonym objects that each correspond to a respective object of an access schema of the database, and API-metadata, which provides one or more mappings, and one or more synonym object definitions. In some examples, in response to a maintenance procedure that results in a change in the access schema, the API-schema is switched to the new access schema (e.g., by updating the one or more mappings).

In some implementations, actions include providing a first access schema, through which a first version of an application accesses data in a database system, establishing an API-schema, through which at least one direct consumer accesses data in the database system, the API-schema including one or more proxy objects that are mapped to respective one or more objects of the first access schema based on metadata of the API-schema, the metadata providing a mapping and one or more object definitions, and in response to execution of a maintenance procedure: providing a second access schema, through which a second version of the application accesses data in the database system, switching to the second access schema, and revising the mapping of the API-schema, such that at least one proxy object of the API-schema maps to a respective object of the second access schema.

Figure 1:
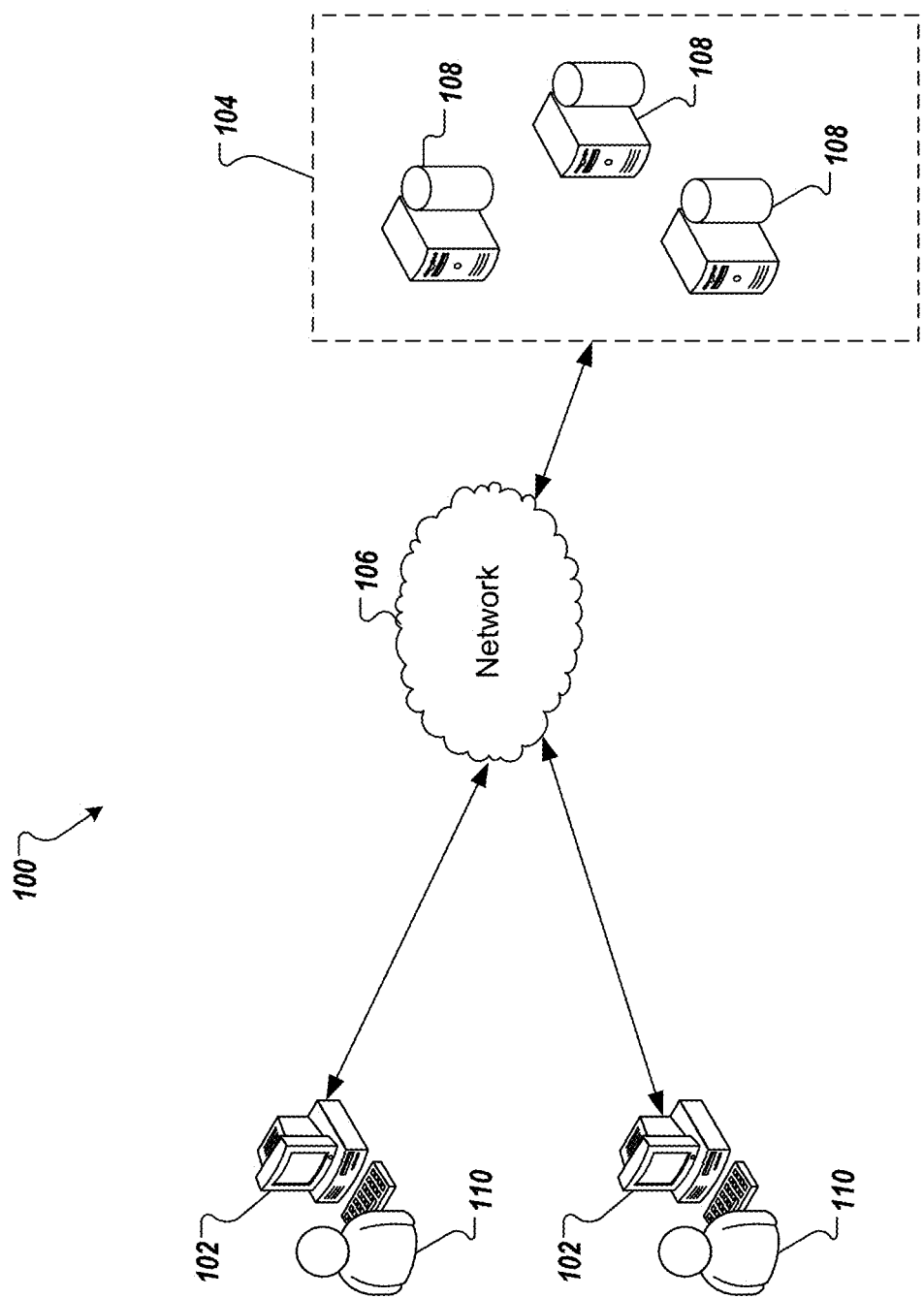
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management operations. In some examples, lifecycle management operations include executing one or more maintenance procedures for an application and/or a database. Example maintenance procedures can include an upgrade procedure, a patch procedure, a configuration procedure, and development and testing procedures. Implementations of the present disclosure will be described in further detail herein with reference to an upgrade procedure. An example upgrade procedure can include updating software. For example, an application can be updated from a first version (e.g., V1) to a second version (e.g., V2). Example updates can include adding functionality to the application, and/or structural changes to one or more tables stored in one or more databases. As another example, a database can be updated from a first version (e.g., V1) to a second version (e.g., V2). Example updates can include updating a data schema of the database, which can involve structural changes to one or more tables. In some examples, a data schema (also referred to as database schema) is a data structure that defines how data is to be stored in the database. In some examples, the structure of a schema can be defined in a formal language that is supported by a database management system (DBMS). In general, a schema can be described as a catalog that specifies all database objects that can be stored in the database. In some examples, different schemas (e.g., V1 versus V2) can have different objects with the same object name, but different structures.

Maintenance procedures, however, can affect how applications interact with the database system. For example, one or more applications (e.g., an ERP application, a CRM application, a SCM application, a PLM application) are hosted on one or more application servers, and interact with data stored in one or more databases through an access schema. Example application servers can include the ABAP Application Server, and the XS Advanced Application Server provided by SAP SE of Walldorf, Germany. The applications are updated with respect to of changes to the access schema resulting from a maintenance procedure. In some examples, a central connection management system updates each of the applications to the changed access schema (e.g., from the V1 access schema to the V2 access schema), enabling the applications continued access to the database system.

Other consumers (e.g., individual desktop tools), however, directly access the database system, and are not accounted for by the central connection management system. Examples of such consumers can include, without limitation, a spreadsheet file (e.g., MS Excel file) that reads data directly from the database, an application which accesses the database using an ODBC connection, or using a OLE DB for OLAP (ODBO), or a XML for Analysis (XMLA) connection. Another example can include a connection/database-level link between multiple databases, which references fixed schema names. For such consumers, a change to the access schema would require connection information, particularly the schema name, within each consumer to be updated. Because each is independent of a central connection management system, any change to the access schema would require individual attention to each consumer. Tens, hundreds, and even thousands of such consumers may be directly interacting with the database system. Consequently, individually updating each consumer in view of changes to the access schema would be time-consuming, and resource-intensive. Data is being red/written/updated by tools like SAP Lumira, Business Objects Cloud, HANA cloud integrator for different instances in SAP HANA Cloud Platform and for example System Landscape Transformation. A change in a schema name would require coordinated change for all tools reading/writing/updating data.

In further detail, multiple application servers (e.g., ABAP and XS Advanced) can access data stored in a database using several schemas, and a central connection management system. During an upgrade procedure, for example, a bridge schema is provided for each existing access schema to prepare for the new version (e.g., V1→V2). During or after the upgrade (depending on the procedure variant), the application server is configured to connect to the new access schema. During a zero downtime upgrade procedure, a new access schema is set up in parallel to the existing one to enable deployment of new versions of database objects, while the start release (e.g., V1) objects are still used and unchanged.

However, database access by external resources (e.g., direct consumers discussed above) requires a stable access schema name. For example, during the upgrade procedure, the access schema used by the application server is re-defined to be a cloned schema, or the application server works with a new access schema after the upgrade. In any case, either during the upgrade or after the upgrade, the access schema name in the database is different from before. While in the application server, a single schema connection can be changed from the one schema to the other, direct database access by direct consumers cannot efficiently be changed centrally, because many of such direct consumers access the database differently from one another.

In view of the above context, implementations of the present disclosure provide an API-schema, through which one or more direct consumers can interact with a database system. More particularly, and as described in detail herein, the API-schema of the present disclosure maintains its name during the upgrade, and contains synonym objects (also referred to as proxy objects), which will be re-directed to the correct clone-schema (or schema, depending on the type of upgrade procedure) after the upgrade. Direct consumers use the API-schema to access the database. Accordingly, the access for the direct consumers is stable (e.g., no name change).

In further detail, the API-schema of the present disclosure includes one or more synonym objects, which reference objects in a set of other access schemas. Although the other schemas may change their names during lifecycle processes (e.g., an upgrade procedure), the name of the API-schema remains static. The API-schema of the present disclosure shields the direct consumers from modifications in the underlying access schema layout. For example, if a lifecycle process creates a new access schema for a new version of a product deployment, the synonym objects in the API-schema are reconfigured to use the new access schema upon the switch of the application from the start version (e.g., V1) to the target version (e.g., V2).

Accordingly, implementations of the present disclosure provide an API-schema delivery infrastructure (ADI), in which a schema name (e.g., API-S) is defined, and a set of synonym objects reside within the API-schema. In some examples, each synonym object is defined using a logical schema name (LS), and an object name (N). In some examples, the API-schema includes a mapping to link the API-schema to an access schema of the database. In some examples, and as described in further detail herein, the mapping can be used to set the LS to Access_X, for example, Access_X referring to a start access schema holding objects with names N (e.g., V1 of the schema definition). In some examples, upon deployment of the API-schema, the logical schema LS is replaced to be Access_X in all object definitions of the API-schema. Accordingly, direct consumers can access the database through the API-schema, which maps to Access_X.

In some implementations, an upgrade of the objects in Access_X can result in a target access schema (Access_Y) being created. In some examples, Access_Y holds new versions of the objects named N (e.g., V2 of the schema definition). The ADI of the present disclosure updates the mapping information to replace Access_X with Access_Y, the ADI determining the objects using the mapping information and re-deploying the objects. Further, synonym objects (N') are defined in the API-schema.

Accordingly, API-schema name (API-S) is stable and un-modified upon an upgrade of objects in Access_X to Access_Y for all consumers using a fixed connection to the API-schema. Accordingly, such direct consumers do not have to redirect access from Access_X to Access_Y.

In some implementations, a synonym object can be any kind of proxy object, and can include a configurable destination. Example configurable destinations can include, without limitations, views, synonyms, projection views (PVs), virtual functions, and proxy procedures. In some implementations, these proxy objects duplicate/replicate additional metadata from the target schema into the API schema (e.g. view-related metadata which is needed by client application). In some implementations, the API schema not only contains objects for one target schema, but can also contain objects of different schemas, handling the changes in the referenced schemas separately. In this manner, the API-schema can be sued to address changes of multiple start access schemas to respective target access schemas.

Figure 2A:
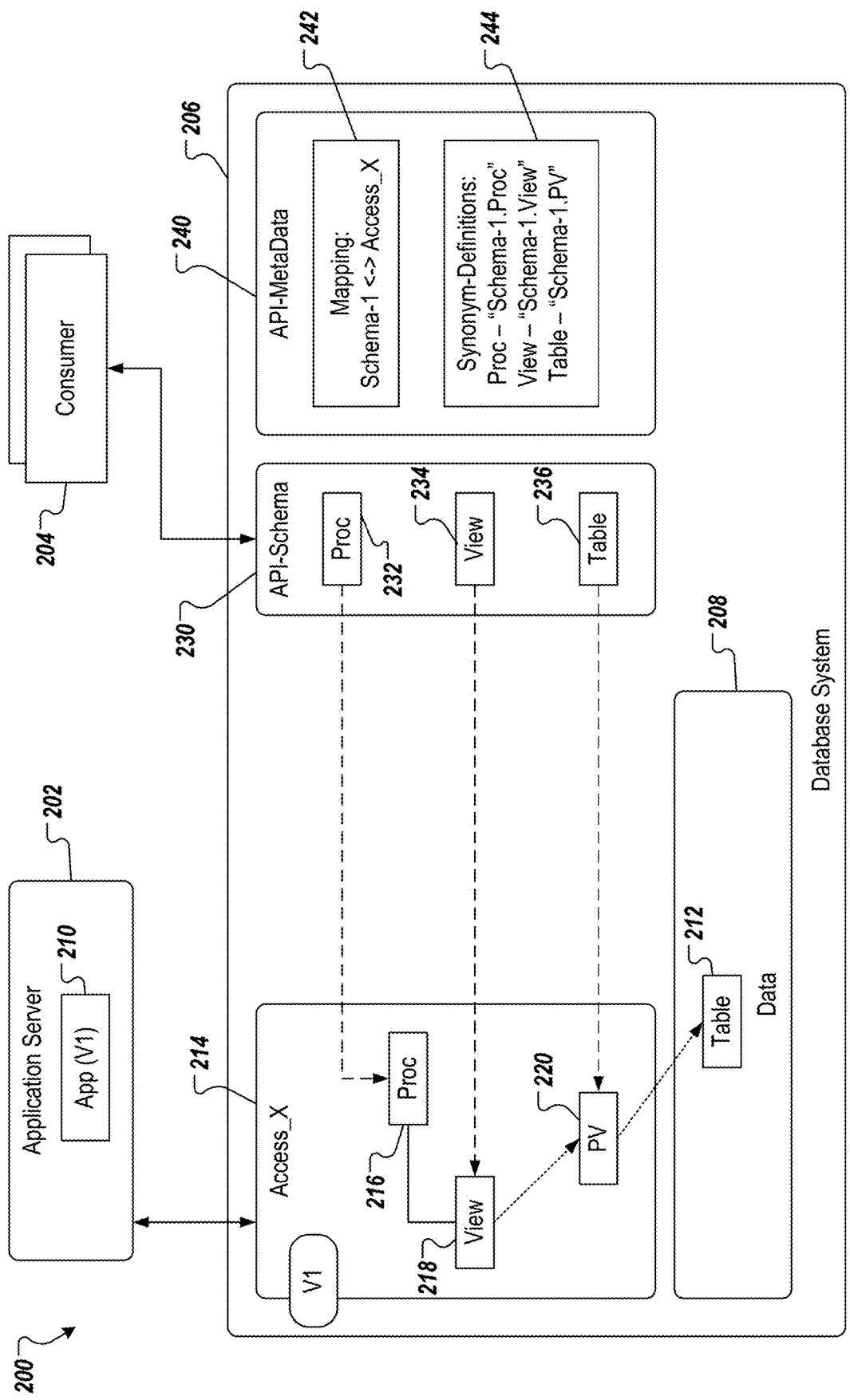
FIGS. 2A-2C schematically depict an example maintenance procedure in accordance with implementations of the present disclosure.
Figure 2B:
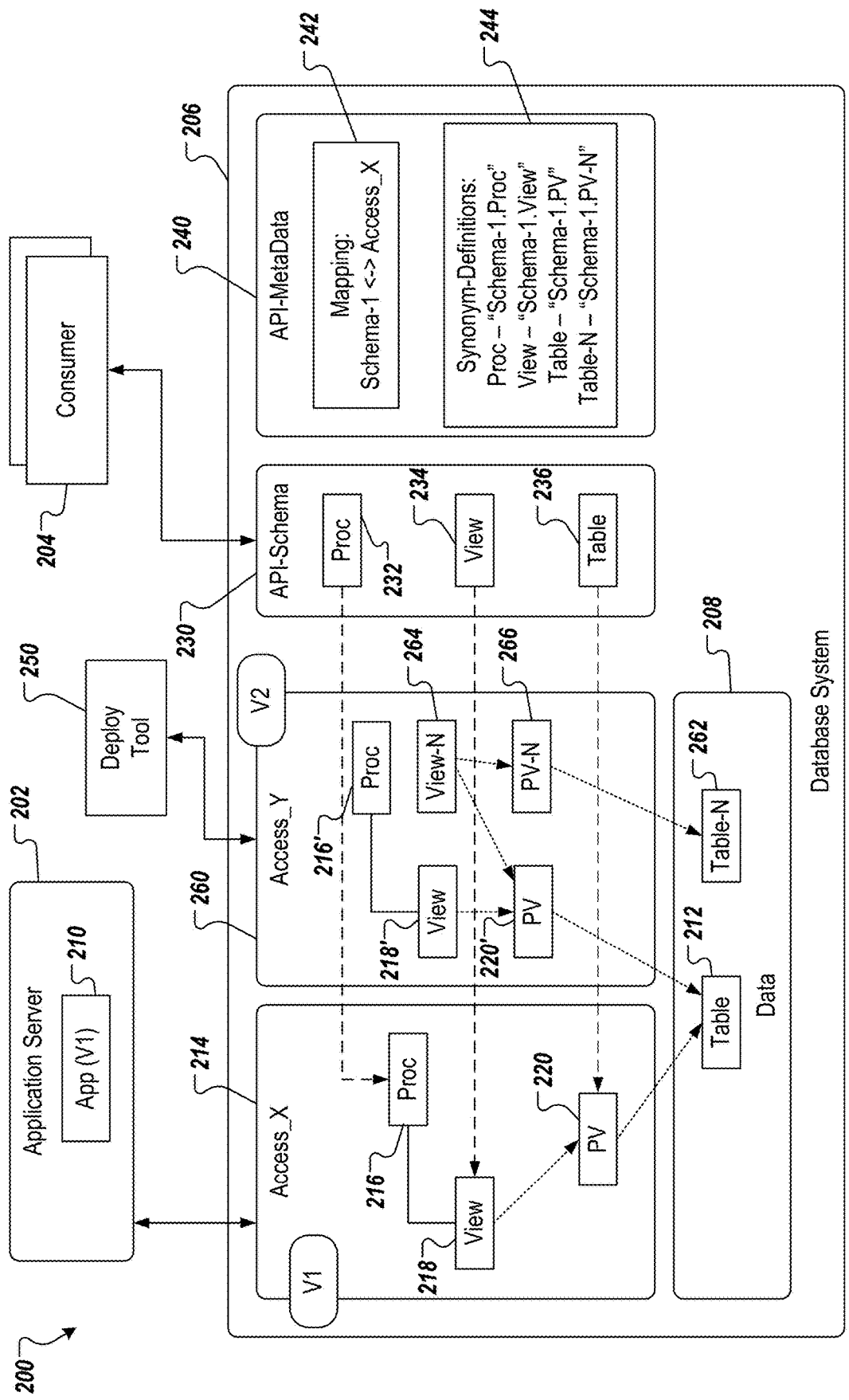
Figure 2C:
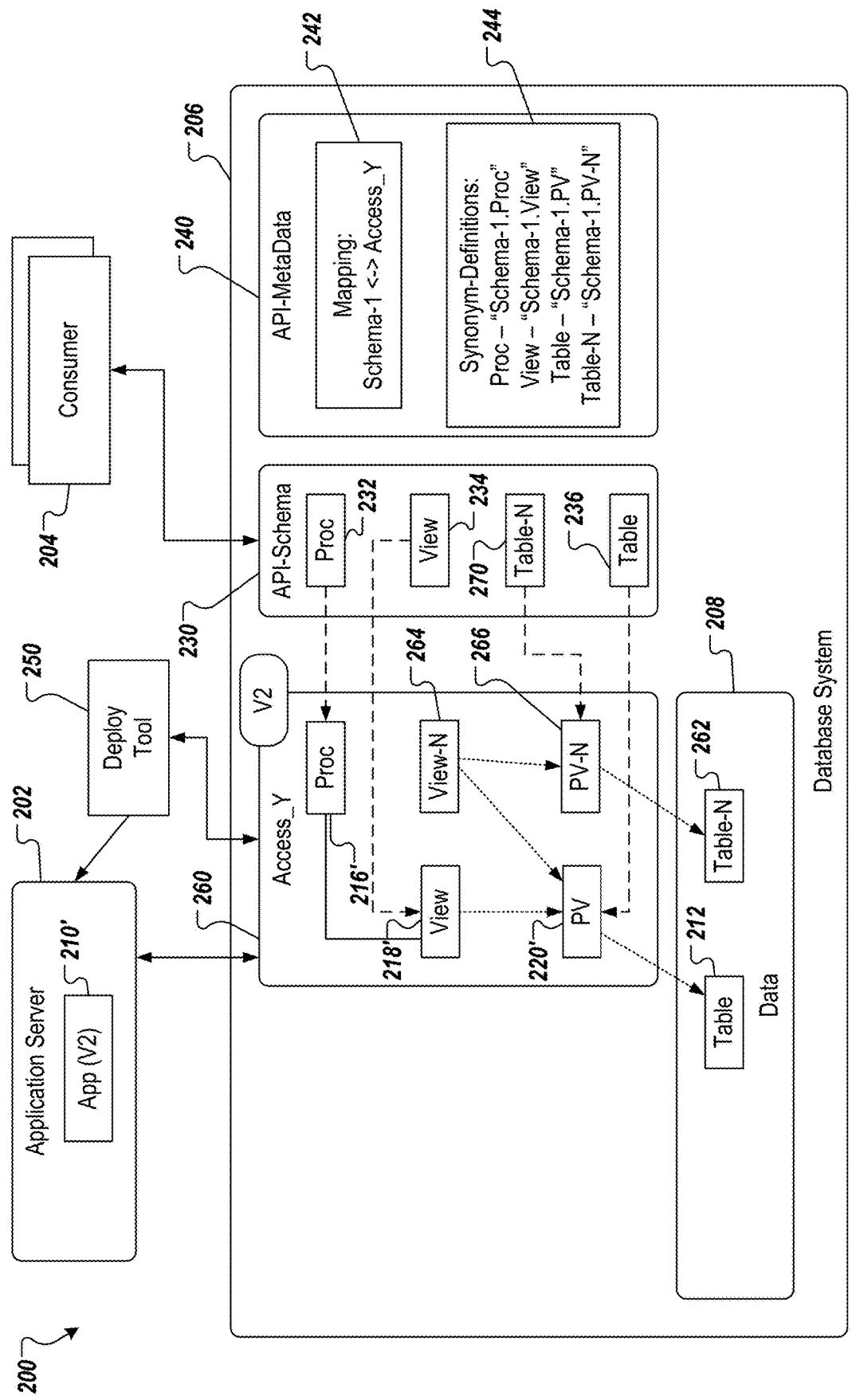

FIGS. 2A-2C schematically depict an example maintenance procedure in accordance with implementations of the present disclosure.

With particular reference to FIG. 2A, an example conceptual architecture 200 is provided. In the depicted example, the conceptual architecture 200 includes an application server 202, and one or more direct consumer 204 that interact with a database system 206. The database system 206 stores data 208, with which an application 210, executing on the application server 202, and the direct consumer 204 interact. In the depicted example, data can be provided in a table 212. In the depicted example, the application 210 is provided as a start version (e.g., V1) application that interacts with the data 208 through an access schema 214, Access_X. The example access schema 214 includes a procedure (Proc) object 216, a view object 218, and a projection view (PV) object 220 that provides a projection view into the table 212.

In the depicted example, the direct consumer 204 interacts with the data 208 through an API-schema 230, and the access schema 214. The API-schema 230 includes a proxy object (synonym object) for each object in the access schema 214. Accordingly, in the depicted example, the API-schema 230 includes a procedure proxy object 232, a view proxy object 234, and a table proxy object 236. Metadata 240 is provided for the API-schema 230, and includes mapping data 242, and synonym definition data 244. In some examples, the metadata 240 is provided as a configuration file for the API-schema 230.

The mapping data 242 indicates a mapping between a logical schema name (LS) (e.g., Schema-1), and an active (physical) access schema (e.g., the access schema 214 (Access_X)). The mapping data 242 is provided in the example mapping format <logical-schema-name>=<physical-schema-name-X>, or <logical-schema-name-2nd>=<physical-schema-name-2nd>. Accordingly, the mapping data 242 can map the API-schema 230 to multiple access schemas (e.g., if multiple access schemas are active). In the example of FIG. 2A, the mapping data 242 provides <schema-1>=<Access_X> to indicate that the API-schema 230 is mapped to the access schema 214.

The synonym definition data 244 defines proxy objects exposed in the API-schema 230. For example, the proxy objects 232, 234, 236 can be provided based on the following example definition format object <object-name>=<logical-schema-name>.<remote-object-name> to respectively provide, as depicted in FIG. 2A:

Proc="Schema-1.Proc"
View="Schema-1.View"
Table="Schema-1.PV"

The name of the API-schema 230 is passed to consumers of the API-schema 230 (e.g., the direct consumers 204), and is further on stable in the name of the schema. In other words, the name of the API-schema 230 does not change. The number of proxy objects in the API-schema, however, may evolve over time. As introduced above, proxy objects are created in the API-schema with a configurable definition (e.g., object <object-name>=<logical-schema-name>.<remote-object-name>; object <object-name-2nd>=<logical-schema-name-2nd>.<remote-object-name-2nd>).

In some implementations, upon deployment of the proxy objects in the API-schema 230, the logical schema name in the object definition is replaced by the physical access schema name. Additionally, the deployment infrastructure remembers the dependency of the object on the schema name definition. In a later step, when the schema name definition is altered, all dependent objects are retrieved from the deployment infrastructure and are altered, as described in further detail herein.

FIG. 2B depicts a deployment of an upgrade procedure, for example, during which a deploy tool 250 deploys the upgrade. In the example of FIG. 2B, the upgrade includes upgrading from a start version (V1) to a target version (V2), which results in a new access schema 260 (Access_Y) for accessing the table 212, and a new table 262 (Table-N). In the depicted example, the access schema 260 includes objects 216', 218', 220' that respectively correspond to the objects 216, 218, 220, and includes a new view object 264 (View-N), and a new projection view object 266 (PV-N).

In response to the new objects of the access schema 260, the API-schema 250 can be updated to include corresponding proxy objects. For example, the synonym definition data 244 is updated to include synonym definitions for the to-be-added proxy objects. In some examples, a definition is not provided for View-N, because View-N not exposed in the API schema. For example, this can indicate a private object of the application that is not being exposed.

FIG. 2C depicts switching over of the start version (V1) of the application 210 to a target version (V2) of the application 210', and activation of the target access schema 260. Upon switch over to the application 210' (and, thus, the new access schema 260), the schema definition in the mapping data 242 is changed. In the example of FIG. 2C, the mapping data 242 is changed from <Schema-1>=<Access_X> to <Schema-1>=<Access_Y>, indicating that the API-schema 230 is now mapped to the access schema 260. In response, dependent object definitions are identified by the deployment infrastructure, and the objects are altered (or dropped and created again). In some examples, any now obsolete are deleted. In the example of FIG. 2C, a proxy object 270 (Table-N) is created in view of the object 266 (PV-N) of the access schema 260.

In some implementations, and as introduced above, the API-schema of the present disclosure can be used with multiple, active access schemas. For example, a first access schema X1 can be used by a first set of applications, and/or direct consumers, and a second access schema can be used by a second set of applications, and/or direct consumers. The API-schema can include respective multiple logical schema names that are mapped to respective access schemas. For example, the mapping data can provide <Schema-1>=<Access_X1> and <Schema-2>=<Access_X2>. Accordingly, the synonym definition data can also include definitions for objects for the multiple access schemas (e.g., Schema-1.Proc; Schema-2.Proc).

If, during a lifecycle event (e.g., upgrade procedure), only one schema is altered (e.g., Access_X2), only the definition of <logical-schema-2> is altered from the physical schema <schema-X2> to, for example, <schema-Y2>. In other words, prior to the upgrade, <Schema-2>=<Access_X2>, and after the upgrade, <Schema-2>=<Access_Y2>. Only the dependent proxy objects are altered in response to this change, the dependent proxy objects being those proxy objects defined using Schema-2. In some examples, if a referenced schema is to be removed from the API-schema, the proxy objects are deleted, as well as the respective schema definition.

Implementations of the present disclosure further provide for shielding compatible API extensions. For example, APIs are defined, for example, for views, with, in addition to the object name, field names, field types, and field sequence and parameters. This shields changes in the underlying persistency from the consumer (e.g. there are additional fields in an exposed table or view).

Implementations of the present disclosure also enable managing of incompatible API changes. Example incompatible API changes can include, without limitation, changes resulting in fewer objects, different structures, and other names. In this event, a new API-schema can be defined in parallel to the old API-schema. For example, an example API-schema "foo_1" can be provided, which exposes a view MATERIAL (ID, TYPE), an example parallel API-schema "foo_2" can be provided, which exposes the view MATERIAL (MATERIAL_ID, MATERIAL_TYPE, MATERIAL_SUB_TYPE, Description), and another example parallel API-schema "foo_3" can be provided, which exposes the view MATERIAL_HEAD (MATERIAL_ID, MATERIAL_TYPE, Description), and the view MATERIAL_ITEM (MATERIAL_ID, MATERIAL_TYPE, MATERIAL_SUB_TYPE, Description). This can be beneficial in instances of broad interfaces with a large number of views. In some implementations, different view names can be provided for extending an API-schema (e.g., MATERIAL_V1 (ID, TYPE), and MATERIAL_V2 (MATERIAL_ID, MATERIAL_TYPE, MATERIAL_SUB_TYPE, Description). This can be beneficial in instances of narrow interfaces with single views, for example.

Figure 3:
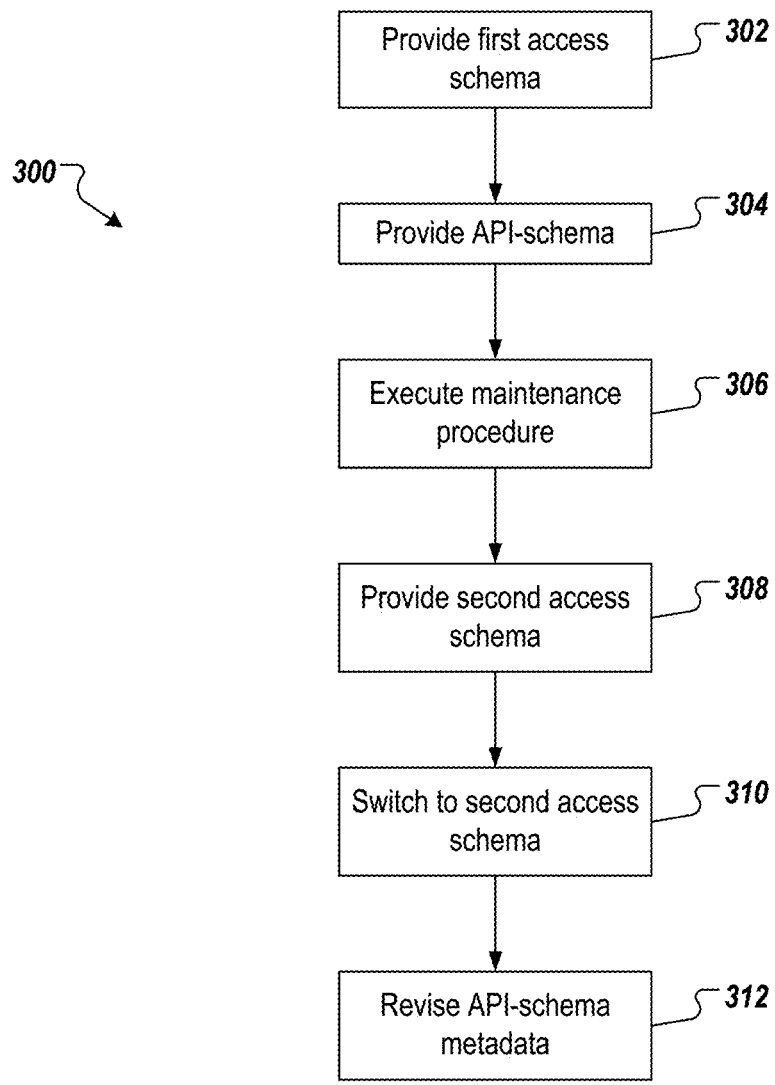
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. In some examples, the example process 300 is executed for as part of a maintenance procedure on a software system.

A first access schema is provided (302). In some examples, a first version of an application accesses data in a database system through the first access schema. For example, the first access schema can include the access schema 214 of FIGS. 2A and 2B, through which the application 210 accesses the data 208 in the database system 206. An API-schema is provided (304). In some examples, at least one direct consumer accesses data in the database system through the API-schema. For example, the API-schema can include the API-schema 230 of FIGS. 2A-2C, through which a direct consumer 204 interacts with the access schema 214 to access the data 208 in the database system 206. In some examples, the API-schema includes one or more proxy objects (e.g., the proxy objects 232, 234, 236) that are mapped to respective one or more objects (e.g., the objects 216, 218, 220) of the first access schema based on metadata (e.g., the metadata 240) of the API-schema. In some examples, the metadata provides a mapping and one or more proxy object definitions. For example, the metadata 240 includes the mapping data 242, and the synonym definition data 244.

A maintenance procedure is executed (306). For example, an upgrade procedure can be executed to upgrade the application from a first version (V1) to a second version (V2). A second access schema is provided (308). For example, as part of the upgrade procedure, the second access schema is provided in the database system, through which the second version of the application is to access the data in the database system upon completion of the upgrade procedure. For example, the second access schema can include the access schema 260 of FIGS. 2B and 2C, through which the application 210' accesses the data 208 in the database system 206 upon completion of the upgrade procedure.

A switch to the second access schema is performed (310). For example, during completion of the upgrade procedure, the second version of the application (e.g., the application 210') is brought online to access the data through the second access schema (e.g., the access schema 260). Metadata of the API-schema is revised (312). For example, the metadata is revised, such that at least one proxy object of the API-schema maps to a respective object of the second access schema. In some examples, the mapping data 242 is updated to include a mapping to the access schema 242, and the synonym definitions are updated in view of any object changes (e.g., addition to, removal of) in the access schema 260 with respect to the access schema 214. Accordingly, the direct consumer 204 connects with the API-schema 230 to interact with the access schema 260 to access the data 208 in the database system 206, post upgrade.

Figure 4:
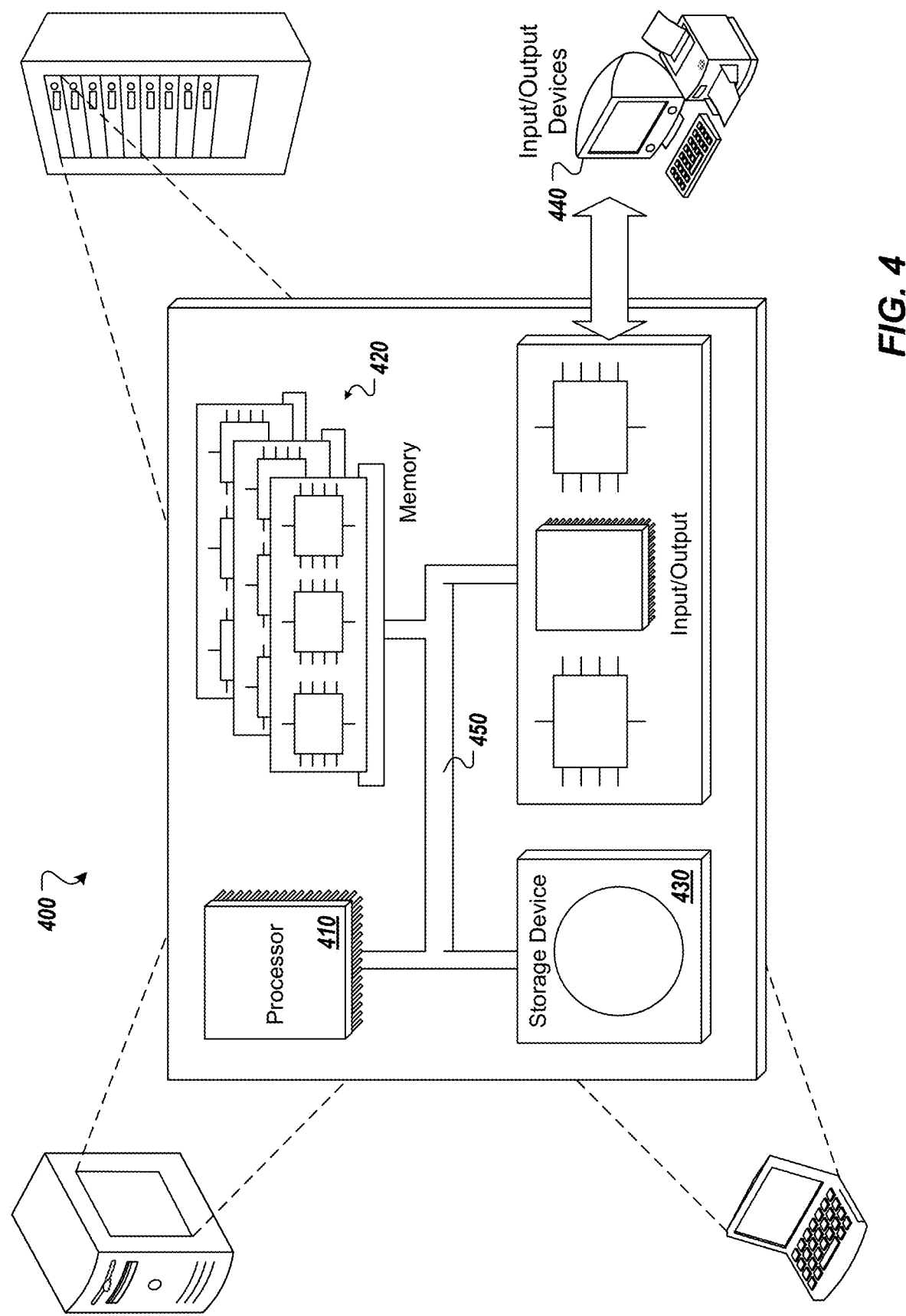
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for database access corresponding to a maintenance procedure executed on a software system, the method being executed using one or more processors and comprising:

providing, a first access schema, through which a first version of an application accesses data in a database system, access of the application through access schemas being managed by a central connection management system, the central management system able to reflect changed access schemas in the application based on names of access schemas;

establishing, an application program interface (API) schema (API-schema) having a static name and providing access to data in the database system as an intermediary between at least one direct consumer and an access schema of the database system, the API-schema enabling the at least one direct consumer to access data in the database system through the first access schema based on the static name of the API-schema prior to execution of any maintenance procedures, the central connection management system being unable to reflect changed access schemas in the at least one direct consumer, the API-schema comprising one or more proxy objects that are mapped to respective one or more objects of the first access schema based on metadata of the API-schema;

in response to execution of a maintenance procedure:
providing a second access schema, through which a second version of the application accesses data in the database system, the second access schema having a name that is different than a name of the first access schema and comprising one or more new objects relative to the one or more objects of the first access schema, switching to the second access schema, revising a mapping of the API-schema, such that at least one proxy object of the API-schema maps to a respective object of the second access schema updating the API-schema to include one or more new proxy objects, each corresponding to a respective new object of the second access schema, and updating the metadata of the API-schema to relate at least a new object of the second access schema to a respective proxy object of the API-schema; and after completion of the maintenance procedure, the API-schema enabling the at least one direct consumer to access data in the database system through the second access schema based on the static name of the API-schema.

2. The method of claim 1, wherein the mapping maps a logical name provided in the API-schema to an access schema.

3. The method of claim 1, wherein the one or more object definitions define a proxy object within the API-schema in view of a respective object within an access schema.

4. The method of claim 1, further comprising, in response to revising the mapping of the API-schema, adding a proxy object to the API-schema.

5. The method of claim 1, further comprising, in response to revising the mapping of the API-schema, removing a proxy object from the API-schema.

6. The method of claim 1, wherein at least one object of one or more of the first access schema and the second access schema comprises one of a view object and a projection object, and at least one proxy object of the API-schema comprises a view proxy object and a projection view proxy object, respectively.

7. The method of claim 1, wherein the API-schema resides in the database system.

8. A non-transitory computer-readable storage medium coupled to one or more processors and having instructions stored thereon which, when executed by the one or more processors, cause the one or more processors to perform operations for database access corresponding to a maintenance procedure executed on a software system, the operations comprising:
providing a first access schema, through which a first version of an application accesses data in a database system, access of the application through access schemas being managed by a central connection management system, the central management system able to reflect changed access schemas in the application based on names of access schemas;
establishing an application program interface (API) schema (API-schema) having a static name and providing access to data in the database system as an intermediary between at least one direct consumer and an access schema of the database system, the API-schema enabling the at least one direct consumer to access data in the database system through the first access schema based on the static name of the API-schema prior to execution of any maintenance procedures, the central connection management system being unable to reflect changed access schemas in the at least one direct consumer, the API-schema comprising one or more proxy objects that are mapped to respective one or more objects of the first access schema based on metadata of the API-schema;
in response to execution of a maintenance procedure:
providing a second access schema, through which a second version of the application accesses data in the database system, the second access schema having a name that is different than a name of the first access schema and comprising one or more new objects relative to the one or more objects of the first access schema,
switching to the second access schema,
revising a mapping of the API-schema, such that at least one proxy object of the API-schema maps to a respective object of the second access schema updating the API-schema to include one or more new proxy objects, each corresponding to a respective new object of the second access schema, and
updating the metadata of the API-schema to relate at least a new object of the second access schema to a respective proxy object of the API-schema; and
after completion of the maintenance procedure, the API-schema enabling the at least one direct consumer to access data in the database system through the second access schema based on the static name of the API-schema.

9. The computer-readable storage medium of claim 8, wherein the mapping maps a logical name provided in the API-schema to an access schema.

10. The computer-readable storage medium of claim 8, wherein the one or more object definitions define a proxy object within the API-schema in view of a respective object within an access schema.

11. The computer-readable storage medium of claim 8, wherein operations further comprise, in response to revising the mapping of the API-schema, adding a proxy object to the API-schema.

12. The computer-readable storage medium of claim 8, wherein operations further comprise, in response to revising the mapping of the API-schema, removing a proxy object from the API-schema.

13. The computer-readable storage medium of claim 8, wherein at least one object of one or more of the first access schema and the second access schema comprises one of a view object and a projection object, and at least one proxy object of the API-schema comprises a view proxy object and a projection view proxy object, respectively.

14. The computer-readable storage medium of claim 8, wherein the API-schema resides in the database system.

15. A system, comprising:
a computing device; and
a computer-readable storage device coupled to the computing device and having instructions stored thereon which, when executed by the computing device, cause the computing device to perform operations for database access corresponding to a maintenance procedure executed on a software system, the operations comprising:
providing a first access schema, through which a first version of an application accesses data in a database system, access of the application through access schemas being managed by a central connection management system, the central management system able to reflect changed access schemas in the application based on names of access schemas;
establishing an application program interface (API) schema (API-schema) having a static name that is static and providing access to data in the database system as an intermediary between at least one direct consumer and an access schema of the database system, the API-schema enabling the at least one direct consumer to access data in the database system through the first access schema based on the static name of the API-schema prior to execution of any maintenance procedures, the central connection management system being unable to reflect changed access schemas in the at least one direct consumer, the API-schema comprising one or more proxy objects that are mapped to respective one or more objects of the first access schema based on metadata of the API-schema;

in response to execution of a maintenance procedure:
  providing a second access schema, through which a second version of the application accesses data in the database system, the second access schema having a name that is different than a name of the first access schema and comprising one or more new objects relative to the one or more objects of the first access schema,
  switching to the second access schema,
  revising a mapping of the API-schema, such that at least one proxy object of the API-schema maps to a respective object of the second access schema
  updating the API-schema to include one or more new proxy objects, each corresponding to a respective new object of the second access schema, and
  updating the metadata of the API-schema to relate at least a new object of the second access schema to a respective proxy object of the API-schema; and
after completion of the maintenance procedure, the API-schema enabling the at least one direct consumer to access data in the database system through the second access schema based on the static name of the API-schema.

16. The system of claim 15, wherein the mapping maps a logical name provided in the API-schema to an access schema.

17. The system of claim 15, wherein the one or more object definitions define a proxy object within the API-schema in view of a respective object within an access schema.

18. The system of claim 15, wherein operations further comprise, in response to revising the mapping of the API-schema, adding a proxy object to the API-schema.

19. The system of claim 15, wherein operations further comprise, in response to revising the mapping of the API-schema, removing a proxy object from the API-schema.

20. The system of claim 15, wherein at least one object of one or more of the first access schema and the second access schema comprises one of a view object and a projection object, and at least one proxy object of the API-schema comprises a view proxy object and a projection view proxy object, respectively.

* * * * *